United States Patent
Schneider (10) Patent No.: US 8,672,705 B2
(45) Date of Patent: Mar. 18, 2014

(54) ENCLOSURE ASSEMBLY FOR A CONNECTOR, STRAIN RELIEF ELEMENT AND METHOD

(75) Inventor: Paul Schneider, Gemonde (NL)

(73) Assignee: TE Connectivity Nederland B.V., 's-Hertogenbosch (NL)

( * ) Notice: Subject to any disclaimer, the term of this patent is extended or adjusted under 35 U.S.C. 154(b) by 107 days.

(21) Appl. No.: 12/931,495

(22) Filed: Feb. 1, 2011

(65) Prior Publication Data

US 2011/0189876 A1  Aug. 4, 2011

(30) Foreign Application Priority Data

Feb. 3, 2010  (EP) ...................................... 10001103

(51) Int. Cl.
 *H01R 13/58* (2006.01)
(52) U.S. Cl.
 USPC .......................................... 439/460; 439/470
(58) Field of Classification Search
 USPC ................... 439/460–462, 470, 371
 See application file for complete search history.

(56) References Cited

U.S. PATENT DOCUMENTS

| | | | | |
|---|---|---|---|---|
| 3,905,672 A | * | 9/1975 | Anhalt et al. | 439/281 |
| 4,145,075 A | * | 3/1979 | Holzmann | 285/81 |
| 4,358,079 A | * | 11/1982 | Navarro | 248/56 |
| 5,465,313 A | * | 11/1995 | Belenkiy et al. | 385/80 |
| 6,582,248 B2 | * | 6/2003 | Bachman | 439/462 |
| 6,752,650 B1 | * | 6/2004 | Lin | 439/491 |
| 7,874,865 B2 | * | 1/2011 | Tobey | 439/460 |
| 2006/0211293 A1 | | 9/2006 | Li et al. | |
| 2007/0110385 A1 | | 5/2007 | Shakeri | |
| 2009/0173518 A1 | | 7/2009 | Flagler | |

FOREIGN PATENT DOCUMENTS

| | | |
|---|---|---|
| GB | 635 089 A | 4/1950 |
| GB | 2 028 009 A | 2/1980 |

OTHER PUBLICATIONS

European Search Report, dated Jun. 30, 2010, issued by the European Patent Office, The Hague, for European Application No. 10001103.0; 8 pages.

* cited by examiner

*Primary Examiner* — Hien Vu
(74) *Attorney, Agent, or Firm* — Faegre Baker Daniels LLP (57) ABSTRACT

The invention relates to a enclosure assembly for at least one connector, including an enclosure, the enclosure having a connector volume configured to receive the connector and an opening at least at a rearward end, a strain relief element being adapted to receive a cable, the strain relief element being provided with a relief portion at one end, the relief portion being configured to support the cable elastically, and with a fastening portion, the fastening portion in a mounted state being arranged at least partially within the opening and affixing the strain relief element to the enclosure. To create an enclosure which is easy to mount and assures a reliable anchorage of the cable within the enclosure, in a pre-mounted state, the enclosure and the strain relief element are adapted to be slid relative to each other in a forward direction (F) up to a forward position, and in that in the forward position the enclosure is automatically engaged in a friction lock with the fastening portion.

18 Claims, 9 Drawing Sheets

ENCLOSURE ASSEMBLY FOR A CONNECTOR, STRAIN RELIEF ELEMENT AND METHOD

BACKGROUND

The invention relates to a enclosure assembly for a connector, comprising an enclosure, the enclosure having a connector volume configured to receive the connector and an opening at least at a rearward end, a strain relief element being adapted to receive a cable, the strain relief element being provided with a relief portion at one end, the relief portion being configured to support the cable elastically, and with a fastening portion, the fastening portion in a mounted state being arranged at least partially within the opening and affixing the strain relief element to the enclosure.

Further, the invention relates to a strain relief element for an enclosure assembly, comprising a relief portion at one end, the relief portion being configured to support the cable elastically, and with a fastening portion, the fastening portion adapted to be arranged at least partially within an opening of an enclosure and to affix the strain relief element to the enclosure.

Furthermore, the invention relates to a method for sealing a connector assembly by an enclosure assembly, the method including the steps of dismantling at least one end of a cable, applying a strain relief element to the end and sliding an enclosure onto the cable into a forward position.

From the prior art, enclosures of the type mentioned above are used as connector plugs or connector adaptors, as shown in U.S. Pat. No. 7,338,214 B1. The shown enclosure has an outer body and an inner body wherein the inner body is configured as a plug body and the outer body as a shell which has a bayonet-style locking section. The enclosure has a strain relief which is mounted on the enclosure by a screw thread.

A further enclosure of the type mentioned above is described in the unpublished patent application EP 09012270.6. The full content of this application is herein incorporated as reference.

A problem which arises in the known enclosure assemblies for connectors is that external forces acting on a connector cable which is connected to the connector received by the enclosure can cause the cable to slip out of the enclosure and thus the connectors to disconnect or the cables to become loose.

Thus, a problem to be solved is how to create an enclosure of the type mentioned above which is easy to mount and assures a reliable anchorage of the cable within the enclosure.

SUMMARY

This problem is solved according to the invention for an enclosure as mentioned above in that in a pre-mounted state, the enclosure and the strain relief element are adapted to be slid relative to each other in a forward direction up to a forward position, and in that in the forward position the enclosure is automatically engaged in a friction lock with the fastening portion.

For a strain relief element as mentioned above the invention is solved in that the strain relief element is adapted to be, at a pre-mounted state, slid along the enclosure in a rearward direction up to a forward position at which the enclosure is automatically engaged with the fastening portion.

The invention relates to a enclosure assembly for a connector, comprising an enclosure, the enclosure having a connector volume configured to receive the connector and an opening at least at a rearward end, a strain relief element being adapted to receive a cable, the strain relief element being provided with a relief portion at one end, the relief portion being configured to support the cable elastically, and with a fastening portion, the fastening portion in a mounted state being arranged at least partially within the opening and affixing the strain relief element to the enclosure.

The "forward direction" is defined for the enclosure as facing in mating direction and in the direction of the mating enclosure, respectively. The "rearward direction" designates an opposite direction, i.e. the direction facing away from the mating enclosure.

This solution effects that the relief portion can be brought into engagement with the enclosure simultaneously while the enclosure is brought into engagement with a mating component, e.g. a mating enclosure. By one single motion of the enclosure in a forward direction into the forward position which is generated when the enclosure is connected to a mating component, the enclosure is engaged with the fastening portion. Further, moving a cable received by the strain relief element against the forward direction may result in an engagement or in a reinforcement of the engagement between the fastening portion and the enclosure.

To move the enclosure to the forward position, the operator has to slide the enclosure over the strain relief element. While moving the enclosure into the forward position, the distance between the opening of the enclosure and the fastening portion is automatically reduced up to the forward position at which the fastening portion is fixed to the enclosure by a force fit and/or a friction locked connection.

The enclosure assembly as well as the strain relief element according to the present invention may be adapted to be applied to all types of connectors in communication technology, especially for fibre optic connectors such as LC-type connectors, copper connectors such as RJ-type connectors, and hybrid fibre/copper connectors.

The solution according to the invention may be combined in any way with one or several of the following further advantageous embodiments respectively and further improved. The enclosure assembly as well as the strain relief element are self-contained inventions, which in each case can be combined in any way with one or several of the following advantageous embodiments. In particular, the main relief element may be used in isolation, i.e. in a context not including the enclosure and its elements as described below.

According to a first advantageous embodiment, the fastening portion may have a peripheral surface, the peripheral surface forming a locking member configured to generate a friction lock to the enclosure. A friction lock facilitates the mounting of the strain relief element, in particular if no positive lock is provided. The fastening portion can be provided with a substantially cylindrical shape without protrusions or locking elements to facilitate arranging the strain relief element at a mounting position and sliding the enclosure along the fastening portion respectively.

To reinforce the friction lock between the fastening portion and the enclosure, the fastening portion and/or the opening of the enclosure can be provided with a friction enhancing structure, such as corrugations. Preferably, the fastening portion may comprise a corrugated surface with corrugations that extend substantially transversely to a forward direction. The fastening portion can be provided with a plurality of corrugations. Preferably, the corrugations are configured to increase the friction or the coefficient of friction, in particular when the fastening portion is engaged with the enclosure. Alternatively, or additionally, the strain relief element at a mounted state of the enclosure assembly may be compressed by the enclosure.

To generate at least partially a positive lock to increase the maximum forces, which can be carried by the strain relief element, the fastening portion can have a substantially conical shape, said conical shape tapering in a rearward direction. Thus, by moving the enclosure in forward direction or by moving the fastening portion in rearward direction, the fastening portion can be wedged into the opening of the enclosure or connected by a positive lock to the inner surface of the opening, in a mounted state surrounding the fastening portion.

To seal the enclosure assembly against environmental influences, for example, humidity, in the forward position the enclosure can be engage sealingly with the fastening portion. Hence, no seal is needed for sealing the enclosure against the environment.

According to another improvement, the enclosure may comprise a sealing member adapted to sealingly engage the fastening portion. In this manner, the sealing function of the enclosure can be improved.

In a further advantageous embodiment of the invention, the strain relief element may comprise an absorber portion, said absorber portion being arranged at an end of the strain relief element opposite to the relief portion. The absorber portion may enclose a section of at least one connector cable which is connected to at least one connector enclosed by the enclosure. The absorber portion may serve to increase the flexibility of the strain relief element, for example, to absorb vibrations coming from a mating connector on a printed circuit board. In a further improvement, the absorber portion may be provided with grooves or recesses extending substantially transversally to the forward direction. Thus, the elasticity and/or flexibility of the absorber portion is increased, in particular, transversally to the forward direction. Preferably, the flexibility or elasticity in the direction of the vibration of a coupled printed circuit board is increased.

In a further advantageous embodiment of the invention, the absorber portion may extend into the enclosure. Thus, movements of the absorber portion, which can be caused for example by vibrations of a connected PCB, remain within the enclosure.

To increase the elasticity of the absorber portion with regard to the fastening portion, the perimeter of the absorber portion is preferably smaller than the perimeter of the fastening portion. To increase the flexibility of the absorber portion, the absorber portion can be provided with grooves extending transversely to the forward direction. Pairs of grooves can be arranged on opposing sides of the absorber portion, resulting in reduced sections facilitating movements of the absorber portion transversely to the forward direction. Between pairs of grooves in an axial direction thickened, preferably substantially cylindrical sections can be arranged to prevent torsion or bending of the absorber portion in a direction transversely to a preferred bending direction.

In a further improvement, to reinforce the connection between the cable extending into the enclosure, the strain relief element can be configured to be moulded over the cable. By over moulding a strain relief element having a fastening portion onto the cable, the fastening portion preferably being provided with a corrugated surface, transmittable retention forces can be increased dramatically. As experiments of the applicant have shown, a cable without an over moulded strain relief element received by an enclosure starts to slip within the enclosure when a tension force applicated to the cable reaches about 30-40 Newton, whereas a cable provided with a strain relief element according to the invention does not move in relation to the enclosure, up to a tension force of at least 130 Newton.

According to a further advantageous embodiment of the enclosure assembly, the enclosure may comprise a sleeve-like inner body and a sleeve-like outer body, the inner body comprising the connector volume and a sealing member being arranged at the opening of the connector volume, the outer body being adapted to be slid over the inner body from a rearward position to a forward position and to compress the sealing member in the forward position.

To facilitate mounting of the enclosure assembly, the enclosure assembly may comprise a stop element configured to be applied undisplaceable to the cable and/or to the strain relief element to avoid sliding of components of the enclosure assembly down the cable or beyond a predetermined rearward position. Thus, the accessibility of the enclosure and/or other components of the enclosure assembly is assured while mounting the enclosure assembly.

In one improved further embodiment, for example, the outer body may be of a substantially hollow cylindrical shape, in which the inner body is received, which may also be of essentially cylindrical shape. Thus, an annular space is defined between the inner and the outer body if the outer body is in the forward position, which may also be of essentially cylindrical shape.

In the forward position, the outer body may, at the rearward end, extend beyond the inner body, so that the sealing member can be securely held between the inner and the outer body.

In a further advantageous embodiment, the enclosure assembly may comprise at least one locking element that is adapted to axially secure the enclosure to a mating component when the enclosure is in the forward position.

The at least one locking element may serve to axially secure the enclosure to a mating enclosure. The locking element may be of the bayonet-type in one preferred embodiment. The bayonet-type is advantageous, as it combines the forward motion, which leads to the sealing of the connector volume by the sealing member at the rearward end of the enclosure, with a limited rotational locking motion for the axial lock. Due to the limited rotational motion, the torsion introduced into the sealing member is limited in the bayonet-style locking element. Of course, instead of the bayonet-type style, other locking elements may be used, such as a thread. A threaded connection however, may require several rotations in order to ensure a tight connection. This in turn may increase torsional strain on the sealing member compared to a bayonet coupling.

To facilitate and thus ensure the sealing of the connector volume at the rearward end, the inner body may be provided according to another preferred embodiment with a clamping section which may open in the rearward direction. Thus, the sealing member may be slid along the cable and/or the strain relief element into the clamping section. The clamping section may have a retainer which is open in the rearward direction for receiving the sealing member. In the forward position of the outer body, the clamping section may be radially compressed onto the sealing member, which in turn is radially pressed onto the fastening portion of the strain relief element and thus seals of any gap between the strain relief element and the sealing member. The clamping section may be radially elastic, e.g. by having radially deflectable, preferably elastic tongues which extend from the inner body along the strain relief element in the rearward direction. The diameter spanned by these tongues is, in their neutral, non-displaced state, larger than the outer diameter of the sealing member, so that the sealing member may be received in the clamping section without using much pressure from the outer body.

The outer body may be provided at its rearward end with a closure section that may essentially comprise a wall section that faces the sealing member and is pressed against the sealing member or the clamping section if the outer body is in the forward position or is being moved into this position. In another embodiment, the outer body may not have any sealing function at all but only serves to lock the enclosure with a mating enclosure. In this case, the sealing of the connector volume may be effected only by the inner body which is therefore provided with the necessary seals and sealing surfaces. However, to increase the tightness of the enclosure assembly not only the connector volume may be sealed, but also the space between the inner and the outer body.

The outer body may be provided with an engagement surface that is adapted to engage the clamping section and compress or deflect it radially around the sealing member if the outer body is in the forward position or moved into this position. The engagement surface may be a tapered or stepped cylindrical surface or wall, or a surface or wall of frustoconical shape. At its forward end, the inner diameter of the engagement surface may be larger than the outer diameter of the clamping section. At its rearward end, the inner diameter of the engagement surface may be smaller than the outer diameter of the clamping section.

Particularly if the locking element is of the type that is rotated in order to be locked, it is preferred that the inner body is provided with at least one positive locking element that prevents a relative rotation between the inner body and the mating enclosure once the inner body and the mating enclosure are at least partly coupled. The positive locking element may be configured as a radially protruding rib extending along the cable direction away from the rearward end, or as a correspondingly formed groove or recess.

In a further improvement, the inner body may be provided at its forward end with a front seal, such as an O-ring, a circumferential and/or a forward-facing sealing surface. The front seal preferably surrounds the plug face in which the connector volume ends.

The connector volume may be of cylindrical or frustoconical shape with the largest diameter located at the plug face. The diameter may taper towards the rearward end. At the rearward end, the diameter of the connector volume is preferably larger than the cable diameter, and at the plug face the diameter is preferably larger than the largest dimension of the connector in the radial dimension, i.e. perpendicular to the axial direction. The part of the connector volume that has a larger diameter than the connector may extend in one preferred embodiment for at least the connector length in the rearward direction from the plug face into the inner body. This allows for a loose reception of the complete connector within the connector volume, so that the connector may move at least in the direction perpendicular to the axial direction in the plug face.

The mating enclosure that is adapted to mate with the enclosure in any one of its above-described configurations may comprise a preferably cylindrical guiding surface which is adapted to receive the plug section of the inner body. The inner contour of the mating enclosure may in particular correspond to the outer contour of at least the front part of the plug body, allowing for a snug fit with only small play. The guiding surface may also be provided with at least one positive locking element that is adapted to engage the at least one positive locking element of the enclosure.

In order to provide adequate sealing, the mating enclosure may be provided with at least one sealing surface. One such sealing surface, preferably cylindrical in shape, may engage the circumferential surface of the inner body sealingly to effect a sealing of the radial gap between the inner body and the mating enclosure. Of course, the sealing may also take place on a forward facing surface of the inner body surrounding the plug face. In this case, the mating enclosure preferably provides a plane wall facing the plug face and a gasket may be interposed between the plug face and the mating enclosure. This sealing surface of the mating enclosure may be a part of the guiding surface.

The mating enclosure preferably comprises a central opening in which the connector and the cable are loosely received, so that in the coupled state, the position of the connector may vary both within the enclosure and the mating enclosure. This may be achieved by dimensioning the central opening—like the connector volume—so that it is larger than the largest radial dimension of the connector.

Fastening elements, such as holes for the insertion of screws or clips may be provided on the mating enclosure so that it can be fixed on a component such as a circuit board or a transceiver and the like. The fastening elements may be arranged on a flange section of the mounting enclosure.

With regard to the method mentioned above, the problem is solved according to the invention in that by sliding the enclosure into the forward position, the strain relief element is automatically engaged sealingly by the outer body.

To further improve the reliability of the enclosure assembly and in particular to increase the maximum force which can be transmitted by the strain relief element onto the cable, the fastening portion may be compressed radially while the outer body is slid to the forward position.

The invention will be described hereinafter in greater detail and in an exemplary manner using advantageous embodiments and with reference to the drawings. The describer embodiments, are only possible configurations in which, however, the individual features as described above, can be provided independently of one another or can be omitted.

DETAILED DESCRIPTION

First, the enclosure according to the invention is described with reference to FIGS. 1 and 2.

Figure 1:
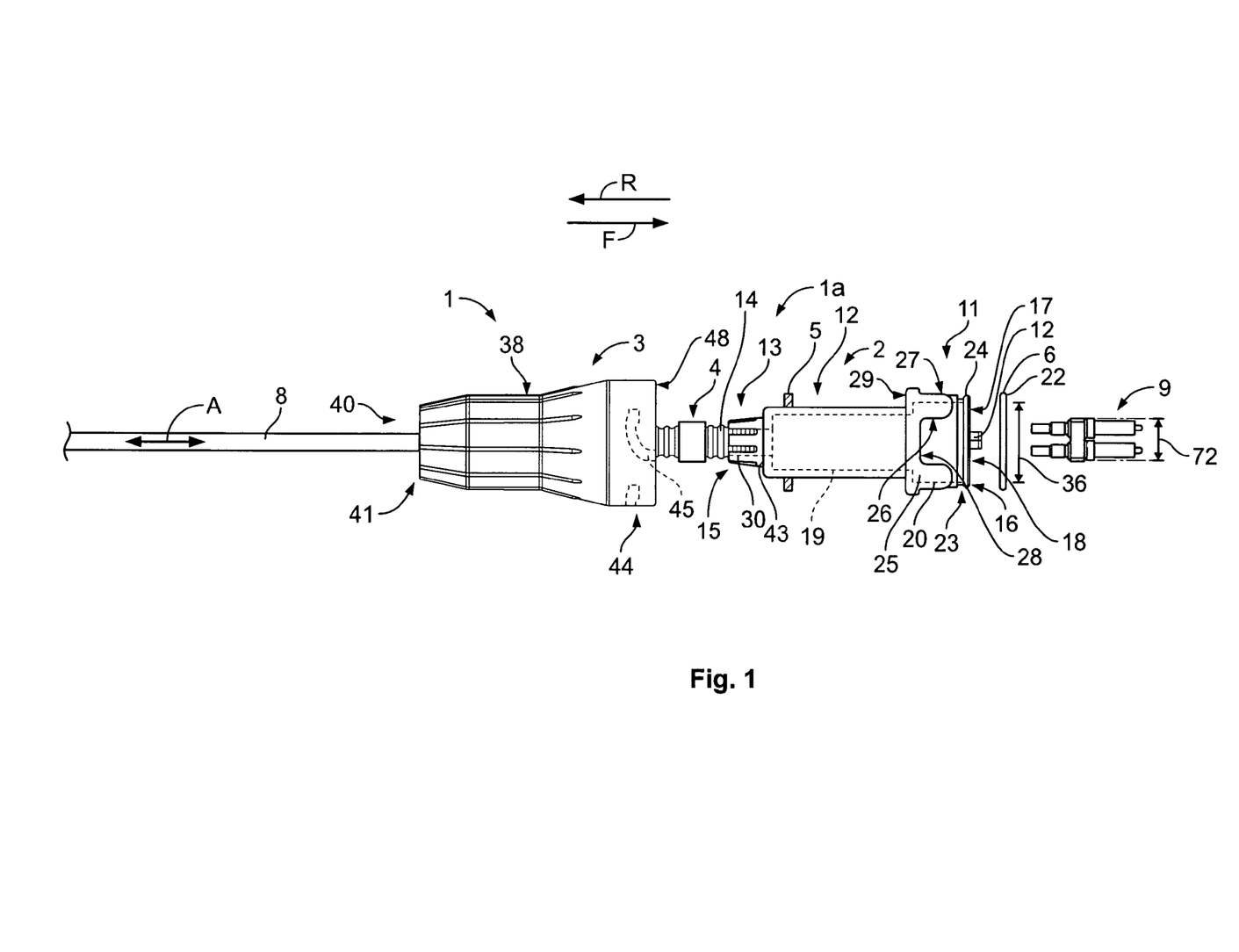
FIG. 1 is a schematic exploded side view of a first embodiment of an enclosure according to the invention.

In the embodiment of FIG. 1 an enclosure assembly 1 is shown that comprises an enclosure 1a, the enclosure 1a comprising an inner body 2, an outer body 3 and a sealing member 4 interposed between the inner body 2 and the outer body 3.

The sealing member 4 may consist of a single elastomeric ring with a preferably rectangular cross section in the circumferential direction. In addition to the sealing member 4, the enclosure 1a may comprise further members like an annular spring element 5 and an O-ring 6, which are also arranged between the inner body 2 and the outer body 3.

Figure 2:
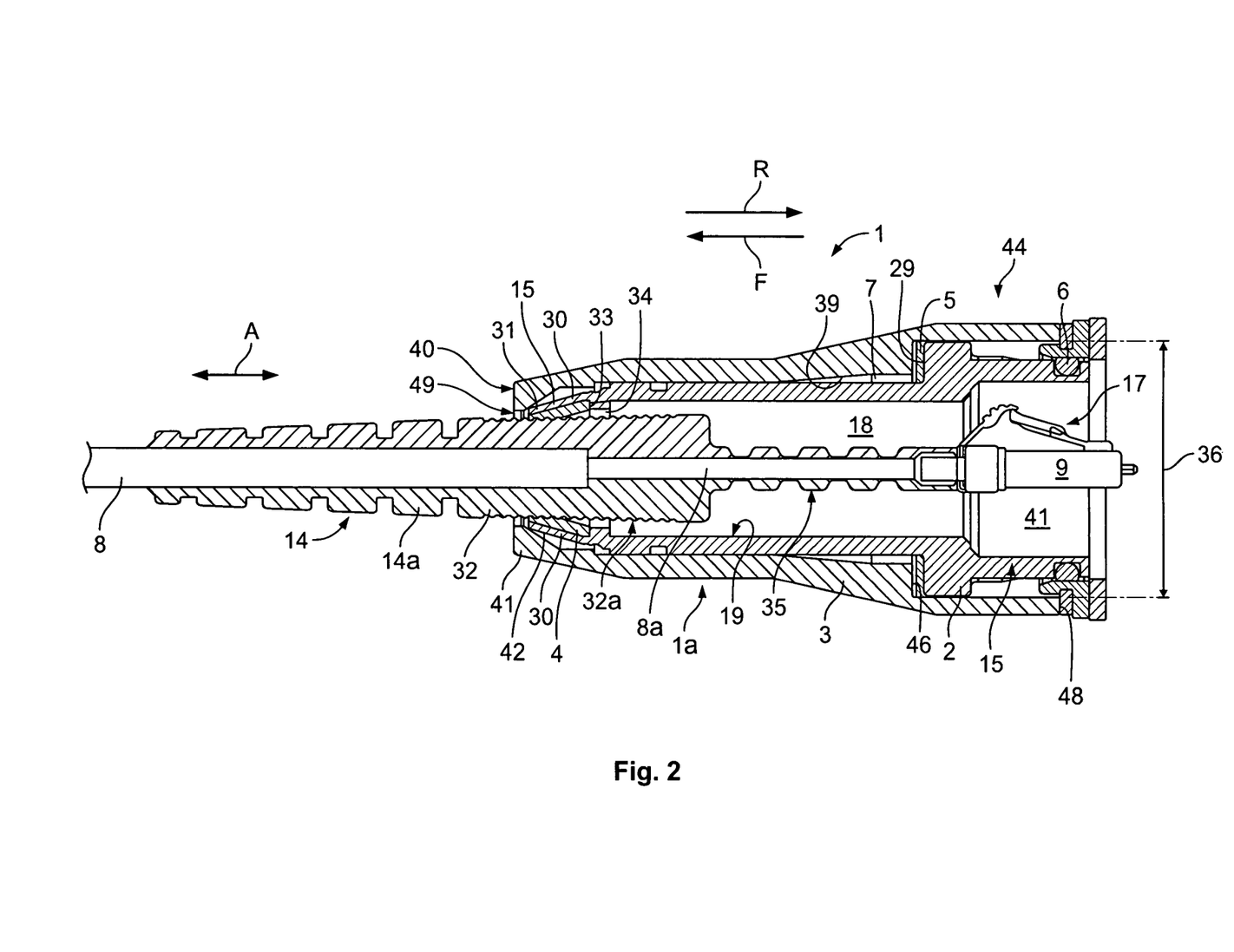
FIG. 2 is a schematic cross sectional view of a first embodiment of an enclosure according to the invention.

The outer body 3 may be moved relative to the inner body 2 up to the forward position shown in FIG. 2. Preferably the outer body 3 can be both slid along the inner body 2 and rotated with respect to the inner body 2. When the outer body 3 is slid over the inner body 2 there remains a generally annular space 7 between the two. The annular space 7 extends parallel to a cable 8 over the entire length of the outer and the inner body. The cable 8 may be a fibre optic cable, in particular a standardized fibre optic cable, or an electrical cable, for example a copper cable.

The enclosure assembly 1 is adapted to be mounted on a cable 8, such as a fibre optic cable or an electrical cable. The enclosure assembly 1 further is adapted to sealingly enclose a connector 9 which is mounted on an end 10 of the cable 8. The connector 9 may be of a standardized type used in communication technology, in particular a dual LC-connector for the transmission of optical data signals, as shown in the figures.

The inner body 2 may be of essentially sleeve-like configuration. It represents a continuous outer wall which mechanically shields the connector volume in the radial direction, i.e. in any direction perpendicular to the cable 8. The inner body 2 may further have a generally elongated shape extending in the direction of the cable 8 and in forward-rearward direction 14, respectively. Preferably, the inner body 2 has a generally cylindrical shape. The inner body 2 may comprise a plug section 11, a support section 12 and, a clamping section 13 (see FIG. 1), wherein all sections 11, 12 and 13 may have a generally cylindrical outer contour. The inner body 2 is adapted to be mounted on a strain relief element 14 and in a pre-mounted state to be slid along the strain relief element 14 and the cable 8, respectively.

Figure 3:
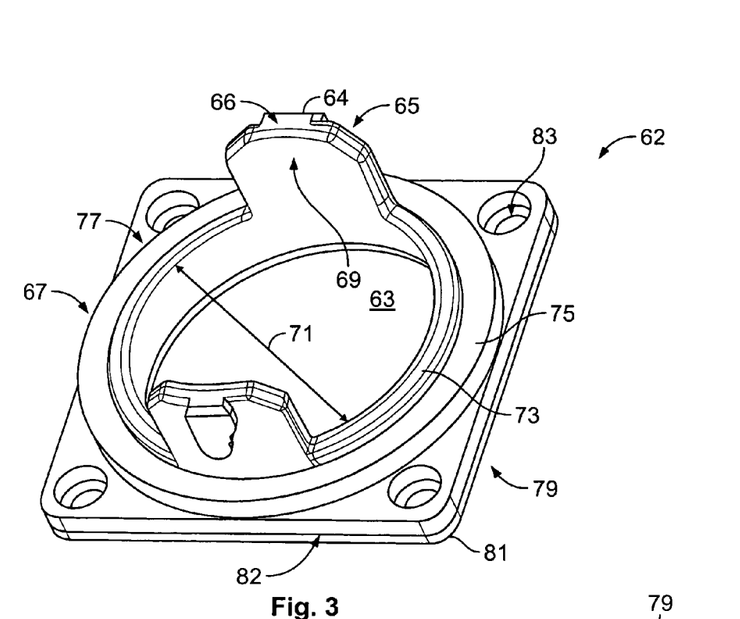
FIG. 3 is a schematic perspective view of a mating enclosure.
Figure 4:
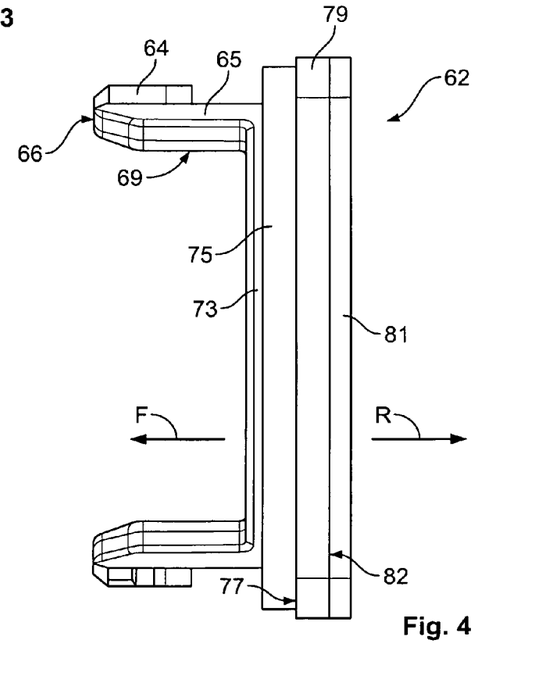
FIG. 4 is a schematic side view of the mating enclosure of FIG. 3.

The clamping section 13 is located at a rearward end 15 of the inner body 2, whereas the plug section 11 is disposed at a forward end 16 of the inner body 2. In the following, all directions relating to the enclosure assembly 1 and facing towards the end 10 of the cable 8 or towards the mating enclosure shown in FIGS. 2-4 are termed "forward direction F". The directions pointing away from the end 10 of the cable 8 or from the mating enclosure shown in FIGS. 2-4 are termed "rearward direction R".

The plug section 11 encloses a plug face 17 facing in forward direction F. The plug face 17 is preferably completely open in the forward direction F and extends into the rearward direction R into the inner body 2, forming a connector volume 18. The connector volume 18 constitutes the interior of the inner body 2.

The connector volume 18 may have a stepped cylindrical shape as shown in FIG. 2, formed by an inner wall 19. The connector volume 18 is dimensioned to receive the connector 9 loosely. At least a forward section 20 of the connector volume 18 has therefore an increased volume. The forward section 20 extends over more than a half of the length of connector 9. Preferably, the forward section 20 extends in axial direction 14 over the complete axial length of the connector 9. Thus, the connector 9 is received loosely, i.e. displaceable in the axial direction 14 and transversely to the axial direction 14. As shown in FIG. 2, the forward section 20 may have a larger diameter than a rearward section 21 of the connector volume 18. Alternatively, the connector volume may be of straight cylindrical or of substantially conical shape tapering in rearward direction R.

The plug section 11 is provide with at least one front sealing surface 22, which in the embodiment of FIG. 1 is formed by the O-ring 6. The O-ring 6 may be inserted into a circumferential groove which is arranged close to the forward end 16. For additional or alternative sealing, an annular front wall section 24 enclosing the plug face 17 and facing in forward direction F may serve as a front sealing surface. For that purpose in a mounted state of the enclosures the front wall section 24 can be pressed against a gasket of a mating enclosure (not shown).

The plug section 11 may comprise at least one positive locking element 25, which preferably has two opposing stop surfaces 26, 27, the stop surfaces 26, 27 may point in opposite circumferential directions about the cable 8 and the plug face 17. The at least one positive locking element 25 may be shaped as a protrusion protruding radially from the plug section 11 and extending in axial direction A. Alternatively, the locking element can be formed as negative locking element, for example, as a groove which has an opening facing in forward direction F, the groove extending on the plug section 11 in axial direction A.

The plug section 11 may have a stop surface 28 facing in forward direction F. The stop surface 28 may serve as a limitation to the depth over which the inner body 2 may be inserted into a mating enclosure. At the rearward end of the plug section 11, a shoulder 29 facing in rearward direction R serves as a further stop which limits the insertion depth of the inner body 2 within the outer body 3. The plug section 11 may have an outer diameter different from the outer diameters of the other sections of the inner body 2 in particular larger.

The support section 12 is of essentially smooth cylindrical shape. In the axial direction I, it may extend over more than a half of the length of the inner body 2 along the strain relief element 14. The support section 12 may serve as support and guidance for the outer body 3 and as a handle to facilitate installation and sliding of the inner body 2 on the strain relief 14. The outer diameter of the support section 12 may be larger than the outer diameter of the clamping section 13.

The clamping section 13 is configured to be deformed, particularly compressed, in radial direction, i.e. perpendicular to the axial direction A. In one embodiment, the clamping section 13 may include radially displaceable tongues 30 that may be spaced equidistantly about the perimeter of the rearward end 15 of the inner body 2, and about the rearward opening of the inner body 3 in which the strain relief element 14 is received. The tongues 30 may extend away from the rearward end, substantially parallel to the axial direction along the strain relief element 14. As shown in FIG. 2, the tongues 30 define a retainer 31 for receiving the sealing member 4 in the annular space between the tongues 30 and the strain relief element 14. At a mounted state, when the sealing member 4 is received in the retainer 31 at the clamping section 13, the tongues 30 are radially overlapping a fastening portion 32 of the strain relief 14.

To facilitate the preassembling of the sealing member 4 within the inner body 2, the inner diameter of the retainer 31 can be smaller than the outer diameter of the sealing member 4 so that the sealing member 4 is firmly held within the retainer by being radially compressed. In addition, the retainer 31 may engage in a rearward direction R behind the sealing member to prevent the sealing member from slipping out while the inner body 2 is slid along the strain relief element 14. To facilitate sliding the sealing member 4 along the strain relief element 14, the inner diameter of the sealing member 4 may be larger than the outer diameter of the strain relief element 14.

Alternatively, the sealing member 4 can be inserted into the retainer 31 after both the sealing member 4 and the inner body 2 have been mounted onto the strain relief element 14. In that case, to facilitate mounting of the sealing member 4, the inner diameter of the retainer 31 may be larger than the outer diameter of the strain relief element 14 so that it can be pushed into the retainer 31 easily. In this embodiment, the sealing member 4 may be used to temporarily fix the inner body to the strain relief element 14 by a press-fit by pressing the sealing member 4 onto the strain relief element 14 and into the retainer 31.

The clamping section 13 is provided with a rearward facing wall 33. The wall 33 constitutes a sealing surface against which the sealing member 4 may be pressed. The wall 33 comprises an opening for the strain relief 14, the diameter of the opening being smaller than the outer diameter of the sealing member 4. This opening 34 connects to the connector volume 18. The wall 33 delimits the retainer 31 in the rearward direction R and forms a sealing surface against which the sealing member 4 abuts when the enclosure is coupled to a mating enclosure.

The inner diameter of the inner body 2 is dimensioned so that an absorber portion 35 of the strain relief element 14 is received loosely and the inner body 2 may be slid along the strain relief element 14. The connector volume 18 including the plug phase 17 has at least at its forward section 20, an inner width 36 that is larger than the largest radial dimension 37 of the connector 9 perpendicular to the axial direction A. The connector 9 may thus be loosely received in the plug phase 17 and the connector volume 18 at least in the region immediately behind the plug phase 17.

The inner body 2 is received by the outer body 3 by sliding the outer body 3 over the inner body 2. The outer body 3 may have a cylindrical shape or, as shown in FIG. 2, the shape of a cylindrical, frusto-conical hollow shell. The length of the outer body 3 in axial direction A may be about the same as the length of the inner body 2. In a mated state of the enclosure assembly 1, the rearward end 15 of the inner body 2 is covered completely by the outer body 3. A gripping structure 38 comprising protrusions and/or recesses may facilitate the handling of the outer body 3.

The interior of the outer body 3 may comprise several sections of different diameter. The axial positions of these sections match in a mounted state of the enclosure. The positions of the sections after inner body 2, i.e. the plug section 11, the support section 12, and the clamping section 13.

The support section 12 may, in one embodiment, act as a guiding surface in interaction with an inner guiding surface 39 arranged within the outer body 3. Preferably, the inner guiding surface 39 is of slightly larger diameter than that of the support section 12. The inner guiding surface 39 may widen slightly, preferably conically, in the forward direction F so that the inner body 2 is received self-centeringly within the outer body 3.

At its rearward end 40, the interior of the outer body 3 is provided with a closure section 41, in which the clamping section 13 is received when the enclosure 1a is coupled to a mating enclosure. The closure section 41 engages behind the sealing member 4 as seen from the connector 9. The closure section 41 is provided with an engagement surface shaped as a tapering inner wall 42. At its forward end the closure section has an inner diameter that is larger than the outer diameter of the clamping section 13. The inner diameter of the wall 42 at the rearward end of the closure section 41 is smaller than the outer diameter of the clamping section 13 and/or the tongues 30. If the outer body 3 is being slid over the inner body 2, the tapering wall 42 will gradually compress the tongues 30 and the sealing member 4 received therein in the radial direction. The wall 42 ends in the rearward direction R in an opening 49 through which the cable 8 and the strain relief element 14 may pass.

At the forward end 44 of the outer body 3, the interior of the outer body 3 forms an enlarged section, whose inner diameter is larger than the inner diameter at the inner guiding surface 39. Thus, the enlarged plug section 11 of the inner body can be accommodated within the forward end 44 of the outer body. At least one locking element 45, e.g. of the bayonet-type, or a thread disposed at the forward end 44 of the outer body, preferably on the interior side facing the plug section 11, serves for affixing the enclosure 1a to a mating enclosure.

The outer body 3 may be provided with an annular abutment surface 46 at the rearward end of a forward part 47 of the connector volume 18. The abutment surface 46 faces the shoulder 29 of the inner body in axial direction A. If the enclosure assembly 1 is coupled to a mating enclosure, the outer body 3 automatically moves to a forward position, at which the annular spring element 5 may be compressed between the shoulder 29 and the abutment surface 46 to bias the inner body 2 away from the outer body 3 and to securely lock the bayonet connection between the enclosure 1a and a mating enclosure.

The outer body 3 may further be provided with a front sealing surface 48 which faces in the forward direction F and surrounds the inner body 2 at its forward end. The front sealing surface 48 may be used as an additional seal besides the O-ring 6 to seal off the connector volume 18 and the space 7 between the outer body 3 and the inner body 2.

An embodiment of a mating enclosure 62 is described exemplarily with reference to FIGS. 3 and 4.

The mating enclosure 62 has a central opening 63 of which the internal width in the radial direction is larger than the largest dimension of the connector 9 in the radial direction.

The mating enclosure 62 is further provided with at least one locking element 64 that matches the at least one locking element 45 of the outer body 3. In particular, as shown in FIG. 1, the at least one locking element 64 may comprise a protrusion 65, to enable a bayonet-type locking with the outer body 3.

As shown in FIG. 3, the locking element 64 may be positioned on two preferably inelastic tongues that protrude from a forward end of the mating enclosure 62 in the forward direction. Two or more of these locking elements may be provided if desired.

In the embodiment of FIG. 3, the protrusions 65 serve also as positive locking elements which engage between the positive locking elements 25 of the inner body 2 to prevent relative rotation between the inner body 2 and the mating enclosure 62. The forward end 67 of the protrusions 65 is designed to abut the stop surface 28 of the inner body 2.

The inner surface of the protrusions 65 is a part of a preferably continuous cylindrical inner surface 69 which continues in the forward-rearward or axial direction to enclose the central opening 63. The inner surface 69 constitutes both a guiding surface and a sealing surface for the inner body 2, in particular the sealing surface 22 or the O-ring 6, respectively. The inner diameter of the inner surface 69 is only slightly larger than the diameter at the forward end 16 of the inner body 2 to ensure a snug fit between the inner body 2 and the mating enclosure 62. The diameter 71 is, however, smaller than the outer diameter of the O-ring 6 so that the O-ring 6 is in sealing contact with the inner surface 69 if the inner body 2 is inserted into the mating enclosure 62.

The mating enclosure 62 has also a preferably annular collar 73 which is of smaller height in the axial direction than the protrusions 65. The collar 73 forms a support for a gasket 75 on its outer circumference. The gasket 75 is adapted to abut against the front sealing surface 60 of the outer body 3 once the enclosure 1a and the mating enclosure 62 are fully coupled.

The forward face 77 of the mating enclosure 62 is formed by a flange 79 which is provided at its rearward face with a gasket 81. Holes 83 may be provided to receive fastening elements.

The gasket 81 is adapted to be sealingly pressed against a component such as a circuit board or an electric or optical amplifier, transceiver or the like, so that no contaminations may reach the connector volume 18 via the rearward face 82 of the mating enclosure 62. The sealing engagement between the O-ring 6 and the inner surface 69 prevents also contaminations such as dirt and moisture from entering the connector volume 18 through the plug face. The optional engagement between the sealing surface 60 and the gasket 75 seals off the space 7 between the inner body 2 and the outer body 3 and of course presents another barrier for dirt and moisture against entering the connector volume 18.

Thus, the connection between the connector 9 and its matching adaptor (not shown) may be completely sealed off with the enclosure 1a and the mating enclosure 62 in their coupled state according to the invention. The size of the connector volume 18 and the central opening 63 in the radial direction ensures that the connector 9 is received loosely. The movability of the connector 9 within the enclosure 1a and the mating enclosure 62 allows compensating variations in the position of the matching adaptor within the central opening 63. Thus, the mating enclosure 62 may be placed at a position where the sealing by the gasket 81 is most effective without regard to the position of the adapter matching the connector 9.

The sealing of the connector volume 18 and preferably also of the space 7 between the inner body 2 and the outer body 3 is effected at the rearward end in a single motion during the coupling of the enclosure 1a and the mating enclosure 62. This is explained in the following.

On site, an operator shortens the cable to the appropriate length that is needed for the desired connection to a component e.g. an SFP transceiver on a printed circuit board having a dual LC-adaptor. Of course, any other component may be used as well.

Before or after shortening the cable 8, the operator first slides the outer body 3 onto the cable with rearward end 40 of the outer body 3 facing away from the cable end 10. After this, the operator mounts the sealing member 4 and then, the inner body 2 with the forward end 16 facing to the cable end 10.

The sealing member 4 may, however, also be pre-assembled with the inner body 2 and be mounted and slid along the cable together with the inner body. The O-ring 6 may also already be pre-assembled on the inner body 2 or may be mounted on site. Finally, the operator mounts the connector 9 onto the end of the cable 8. Now, the enclosure assembly 1 is mounted in the configuration shown in FIG. 2.

If, starting from the position shown in FIG. 2, the enclosure 1a is to be coupled to a mating enclosure 62 (FIG. 3), first, the connector 9 is mated to a corresponding adaptor (not shown). Then, the inner body 2 is slid forward on the cable 8 until engagement with the mating enclosure 62. The stop surface 28 prevents that the inner body 2 is inserted too deeply into the mating enclosure. In the shown embodiment, this engagement leads also to a positive lock between the inner body 2 and the mating enclosure 62. The positive lock prevents rotation of the inner body 2 with respect to the mating enclosure 62.

Next, the outer body 3 is slid forward on the cable 8 over the inner body 2 into its forward position in order to bring the locking element 45 of the outer body 3 into engagement with a matching locking element on the mating enclosure 62.

If the sealing member is not yet received in the retainer 31, the outer body 3 in one embodiment may automatically push the sealing member 4 along the cable 8 in the forward direction F into the retainer 31.

Preferably, the outer body 3 is guided in the forward-rearward direction, i.e. along the cable 8, by the support section 12 to further facilitate the coupling process. Near the end of the forward motion of the outer body 3, the clamping section 13 is compressed around the sealing member 4 by the tapering wall 42. The radial compression leads to a tight fit of the sealing member 4 on the cable 8 and to a lengthening of the sealing member 4 in the axial direction so that the sealing member 4 presses against wall 33. Thus the rearward end of the connector volume is sealed off. If the axial length of the sealing member is chosen so that it projects in the rearward direction from the clamping section, the space 7 may also be sealed by the tapering wall 42 pressing directly against sealing member 4.

During the forward motion, the locking elements of the outer body are brought into engagement with the locking elements of the mating enclosure 62. At the end of the forward motion of the outer body 3 relative to the inner body 2 and the mating enclosure 62, the outer body is rotated with respect to the inner body 2 which is locked non-rotationally to the mating enclosure 62 due to the locking elements 26, 27, 65. This leads to a full engagement of the locking elements and a completion of the connection. At the same time the spring element 5 is compressed axially between the outer and the inner bodies 2, 3. The compression of the spring element 5 may be released somewhat at the end of the rotation by allowing the outer body 3 to move away from the mating enclosure 62 at the end of the rotation and snap into a recess. Thus, the outer body 3 and the mating enclosure 62 are locked non-rotationally at this position. Release of the locking engagement may only be effected after the outer body 3 is moved towards the mating enclosure 62 against the action of the spring 5.

At the forward position, the O-ring 6 is in sealing engagement with the inner surface 69, and the front surface 48 is pressed into the gasket 75.

Figure 5:
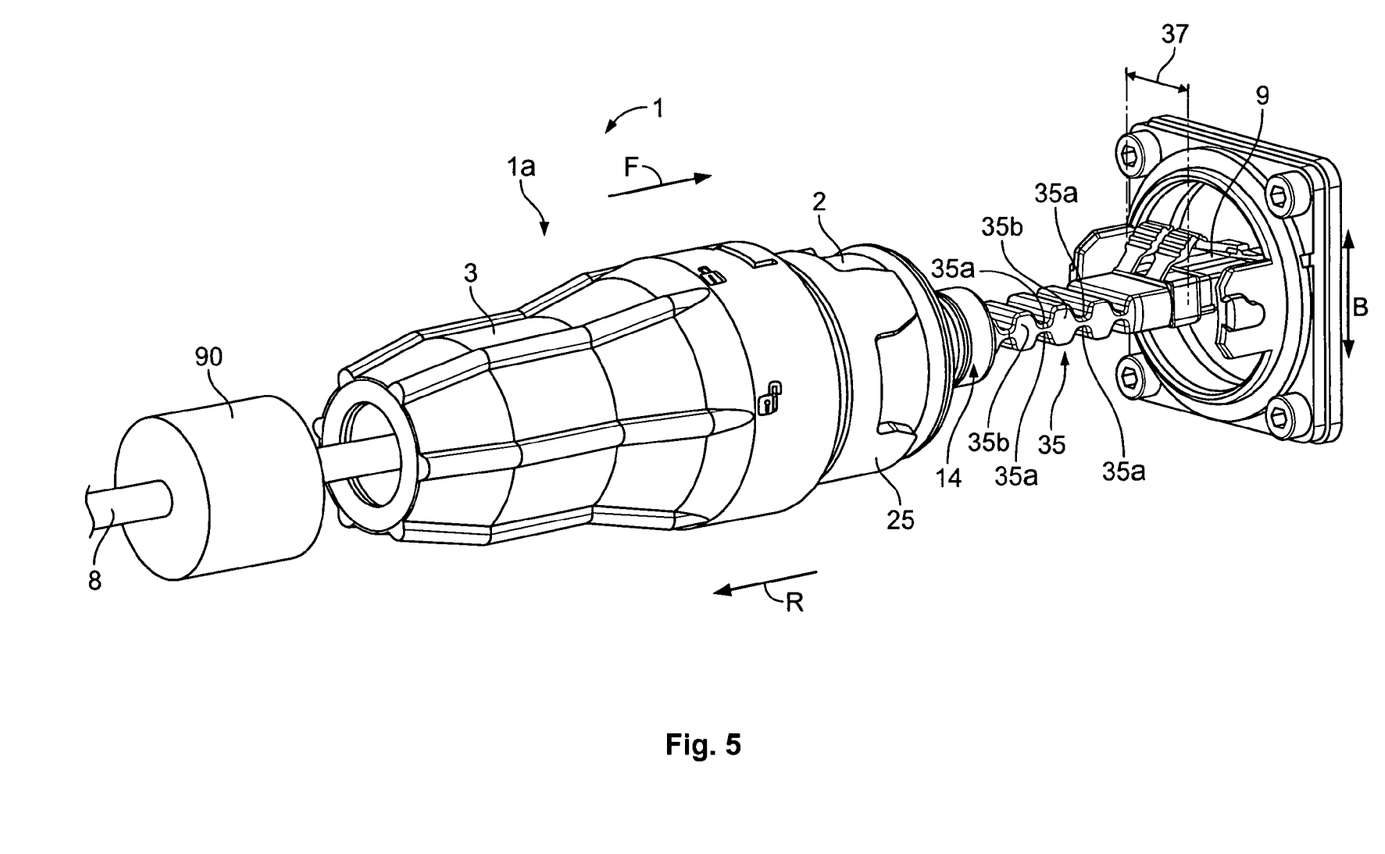
FIG. 5 is a schematic perspective view of a second embodiment of an enclosure according to the invention.
Figure 6:
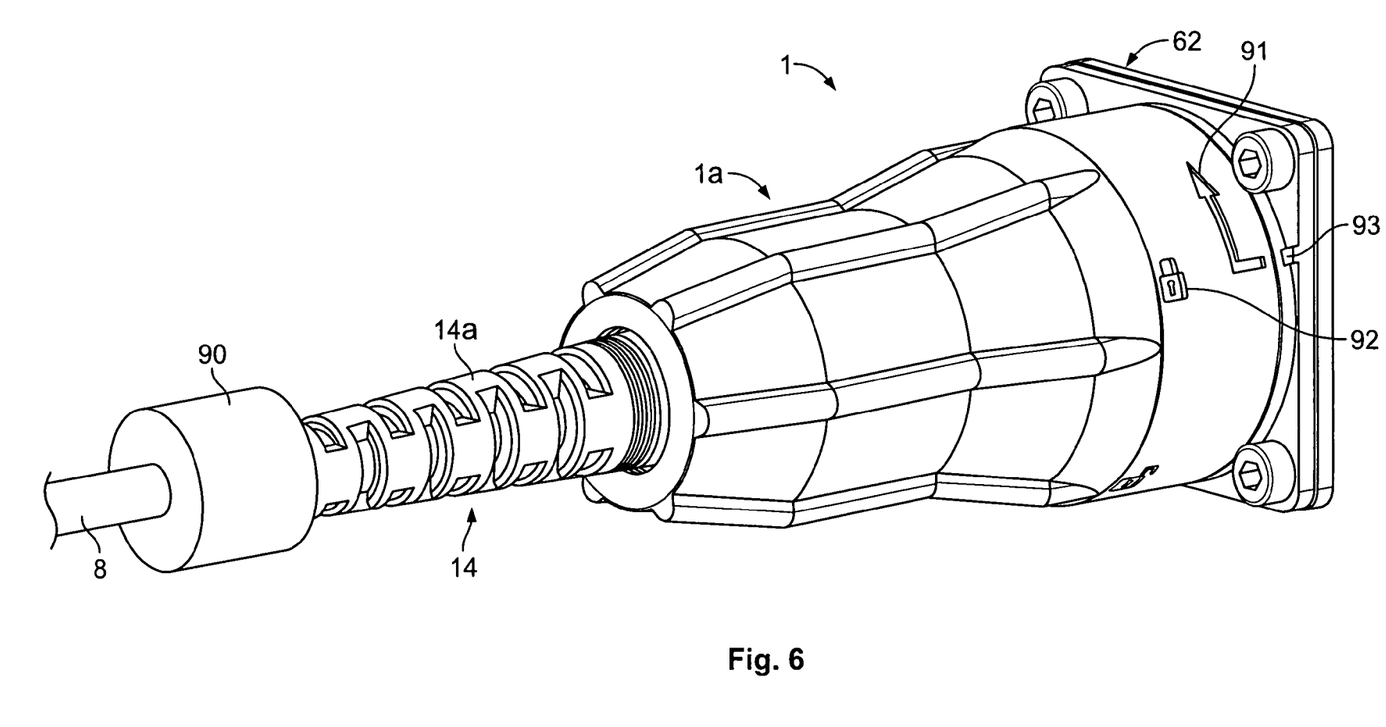
FIG. 6 is a perspective view of the enclosure of FIG. 5 in a mounted state.

FIG. 5 shows an enclosure according to the invention in a pre-mounted state. The enclosure 1a is arranged slidable on the cable 8 and on the strain relief element 14, respectively. The enclosure may be slid along the strain relief element up to a forward position at which the enclosure is engaged with the fastening portion 32 of strain relief element 14.

In rearward direction R behind the enclosure 1a, a stop element 90 is applied to the cable 8. The stop element 90 may be affixed to the cable 8 by bonding, clamping or by moulding the stop limit 90 over the cable 8. The stop element 90 serves to define a rearward position of the enclosure 1 on the cable 8 or on the strain relief element 14. The stop element 90 prevents the components of the enclosure 1a as the inner body 2 or the outer body 3 from getting lost.

The strain relief element 14 comprises an absorber portion 35 which is adapted to receive an at least partially dismantled portion 8a of the cable 8. The absorber portion 35 extends in forward direction F and serves to absorb movements, for example vibrations, coming from the connecting 9 and caused by a connected component. For example, a printed circuit board connected to the connector 9 may vibrate in operation and transmit the vibrations to the connector 9.

The connector 9 is a LC-duplex connector. To couple the connector 9 to the strain relief element 14 the end of the connector 9 pointing towards the enclosure 1a has been over moulded by the strain relief element 14, in particular by the absorber portion 35.

To increase the flexibility of the absorber portion 35, the absorber portion 35 is provided with grooves 35a extending transversely, preferably perpendicularly to the forward direction F. Pairs of grooves 35a are arranged on opposing sides of the absorber portion 35, forming sections having a reduced thickness or diameter. These sections form hinges and thereby facilitate movements of the absorber portion 35 transversely or perpendicularly to the forward direction F. Between pairs of grooves 35a thickened, substantially cylindrical sections 35b are arranged, which prevent torsion or bending of the absorber portion 35 in a direction transversely to a preferred bending direction B. As the cylindrical sections 35 extend in a common direction, which runs substantially perpendicularly to the preferred bending direction B, the absorber portion 35 is reinforced by the sections 35 transversely to bending direction B.

Figure 7:
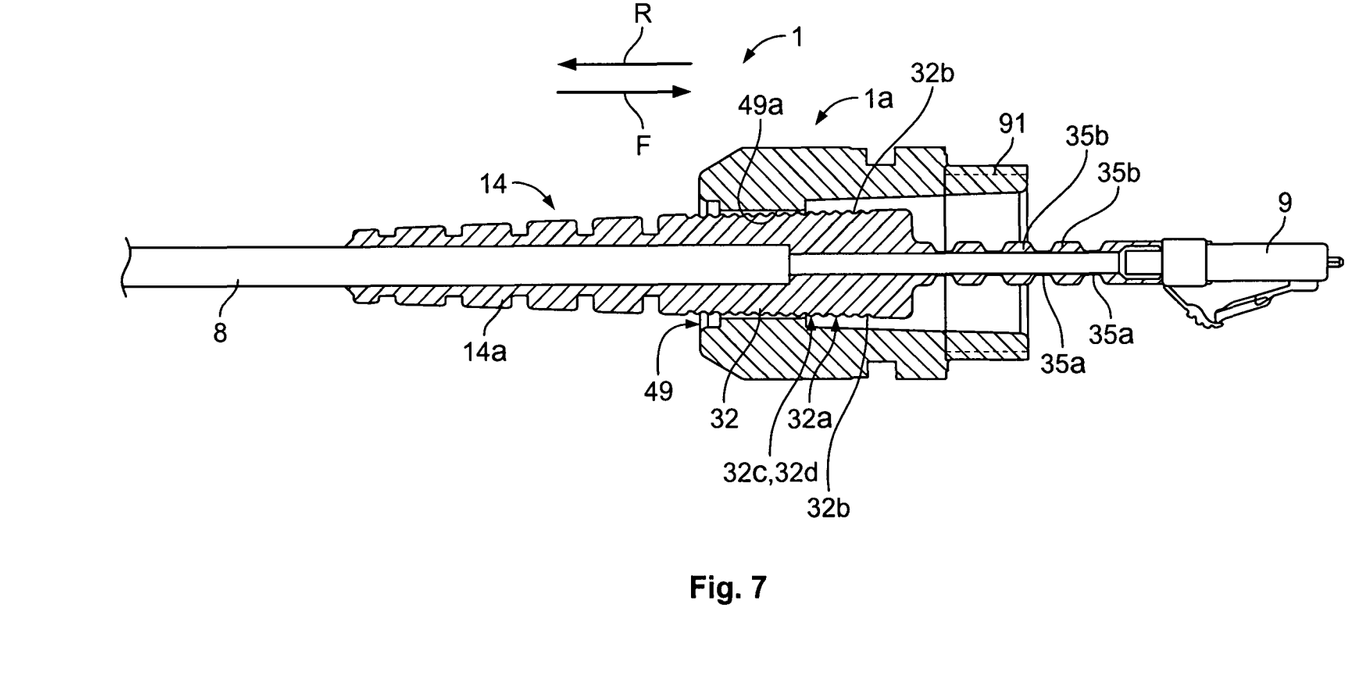
FIG. 7 is a schematic sectional side view of a third embodiment of an enclosure according to the invention.

FIG. 7 shows a further embodiment of the present invention, and the same reference numerals have been used. Since most of the details illustrated therein are identical to the first embodiment, only the differences thereto will be described in more detail.

The enclosure assembly 1 is disposed in a mounted state, and connected to a mating enclosure 62. As shown by indicators 91 and 92 on the enclosure 1a and by indicator 93 on the mating enclosure 62, the enclosure 1a is locked on the mating enclosure 62. Further, the indicator 91 indicates the direction, in which the enclosure 1a has to be rotated to unlock the connection between the enclosure 1a and the mating enclosure 62.

In one embodiment of the invention, the stop element 90 can be mounted on the strain relief element 14 or be an integral part of strain relief element 14. As well as the strain relief element 14, the stop element 90 can be moulded over the cable 8.

FIG. 7 shows a third embodiment of the present invention and the same reference numerals have been used. As most of the details illustrated therein are identical to the embodiments described above, only the differences thereto will be described in more detail.

The enclosure 1a is formed from one piece. To allow for a reliable connection between the strain relief element 14 and the enclosure 1a, the opening 49 has a conical shape, which has the same gradient as the conical shape of the strain relief element 14. When the strain relief element 14 is moved in rearward direction R within the opening 49 of the enclosure 1a or when the enclosure 1a is slid in forward direction F on the fastening portion 32 of the strain relief element 14, the corrugated surface 32a of the fastening portion 32 abuts an inner fastening surface 49a of the opening 49. Thus, a friction lock between the strain relief element 14 and the enclosure 1a and simultaneously a positive lock between the strain relief element 14 and the enclosure 1a is generated.

The enclosure 1a is provided with an external screw thread 91, which is adapted to be screwed into an internal screw thread of a mating enclosure (not shown). While the enclosure 1a is screwed into a mating enclosure, the enclosure 1a moves in forward direction F up to a forward position at which the enclosure is engaged with the fastening portion.

The strain relief element 14 is adapted to receive the cable 8. Preferably, the strain element 14 is moulded over the cable 8 so that the strain relief element is manufactured and connected to the cable in one step.

The strain relief element 14 is provided with a relief portion 14a at an end pointing in rearward direction R. To support the cable 8 elastically, the relief portion 14 is segmented and tapering in rearward direction R.

In forward direction F, adjacent to the relief portion 14a, the strain relief element 14 has a fastening portion 32, which in a mounted state of the enclosure assembly is arranged partially within the opening 49 of the enclosure, affixing the strain relief element 14 to the enclosure. To improve the reliability of a force closure or a friction lock, which can be generated between the opening 49 and the strain relief element 14, the fastening portion 32 is provided with a peripheral surface 32a. The peripheral surface 32a is provided with corrugations 32b. The corrugations 32b are configured to generate or to reinforce a friction lock to the enclosure. The plurality of corrugations 32b on the peripheral surface 32a forms a corrugated surface 32c. The peripheral surface 32a provided with corrugations 32b forms a locking member 32d.

Further, the fastening portion 32 has a substantially conical shape, the conical shape tapering in rearward direction R. Thus, sliding the enclosure 1a in forward direction F over the fastening portion or moving the strain relief element 14 in rearward direction R within the enclosure 1a results in increased normal forces between the fastening portion 32 and the inner surface 49a of the opening 49, up to a forward position, in which the enclosure is engaged with the fastening portion.

The peripheral surface 32a of the fastening portion 32 may serve as a sealing surface for sealing the connector volume 18 against the environment. To improve the sealing function of the strain relief element 1, at least at the fastening portion 32 the strain relief element 1 may be provided with a sealing material, for example, rubber or silicon.

Figure 8:
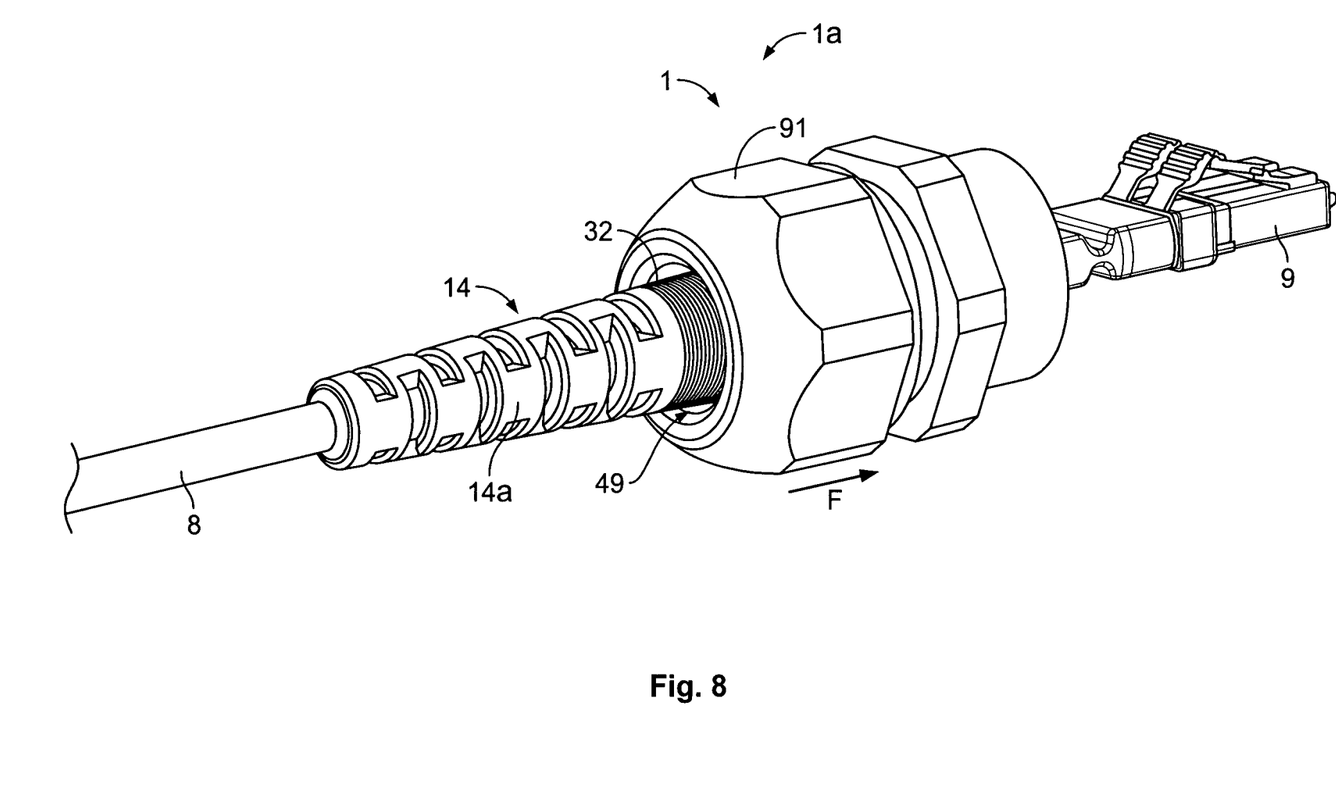
FIG. 8 is a schematic perspective view of the enclosure of FIG. 7.

FIG. 8 shows the embodiment of FIG. 7 in a schematic perspective view to facilitate screwing the enclosure 1a into a mating enclosure (not shown), the enclosure 1a is provided with a hexagonal nut 91. While screwing the enclosure 1a into a mating enclosure, the enclosure 1a slides on the strain relief element 14 and in particular on the fastening portion 32 in forward direction F up to a forward position, at which the opening 49 is sealingly engaged with the fastening portion 32. At the forward position, the conical shape or wedge shape fastening portion 32 of the strain relief element 14 is wedged within the conical shaped opening 49 of the enclosure 1a.

Figure 9:
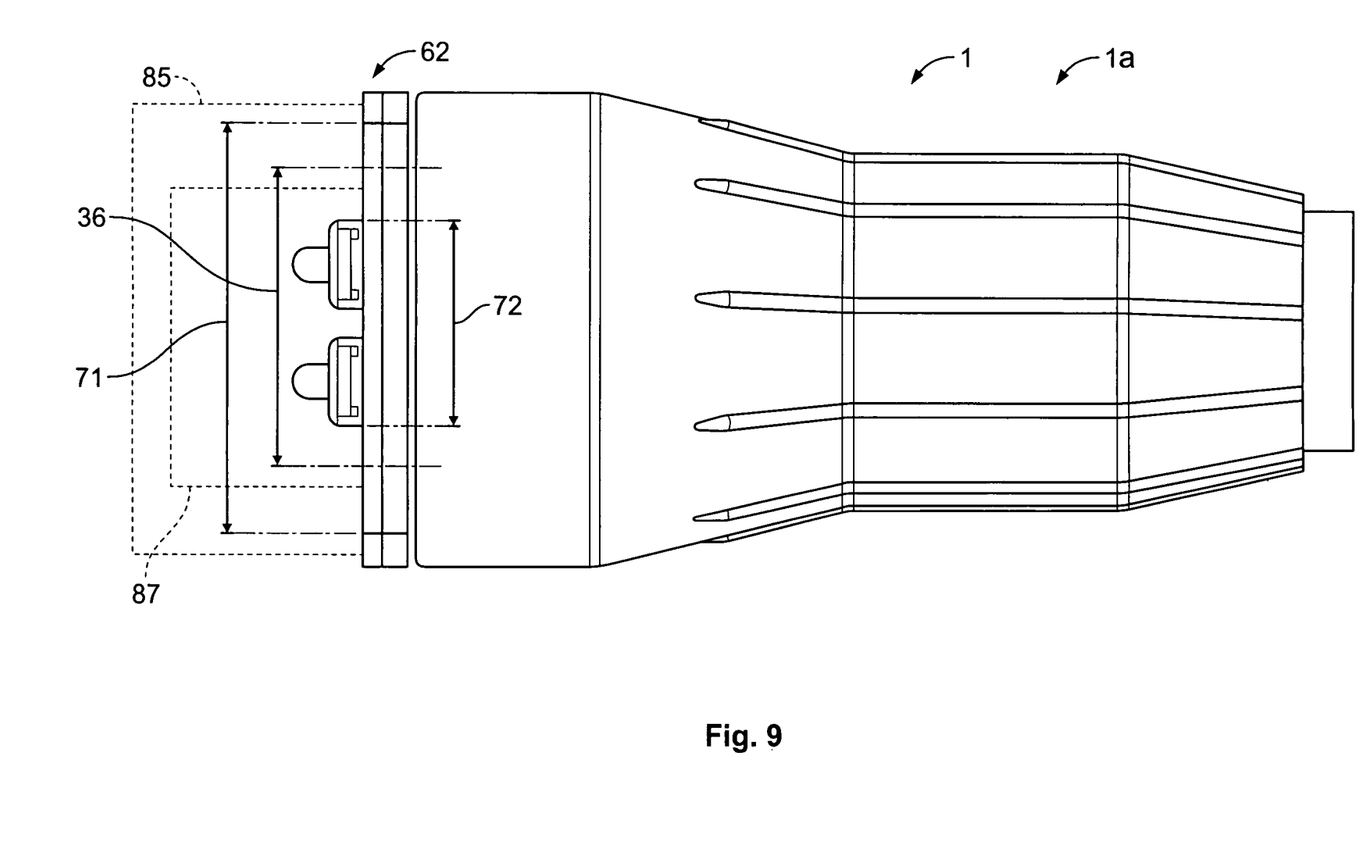
FIG. 9 shows the sealing assembly comprising the enclosure of FIG. 1, 2 and the mating enclosure of FIG. 3, 4 in the plug state in a schematic side view.

FIG. 9 shows a sealing assembly 84 comprising sealing assembly 1 and the mating enclosure 62 in the coupled state, i.e. the outer body 3 in the forward position, without strain relief element. The mating enclosure 62 is mounted on a component 85 that is shown schematically using phantom lines. As can be seen, the inner widths 36, 71 of the connector volume 18 and of the central opening 63 are larger than the largest radial dimension 72 of the connector 9 so that the connector 9 may be moved within the mounted enclosure 1a and mating enclosure 62 to adapt to the actual position of an adaptor 87 within the mating enclosure 62. The overall configuration of the enclosure assembly 1 allows for an easy single-handed mounting operation. The sealing and the locking of the enclosure 1 and the mating enclosure 62 is effected in a single motion.

Figure 10:
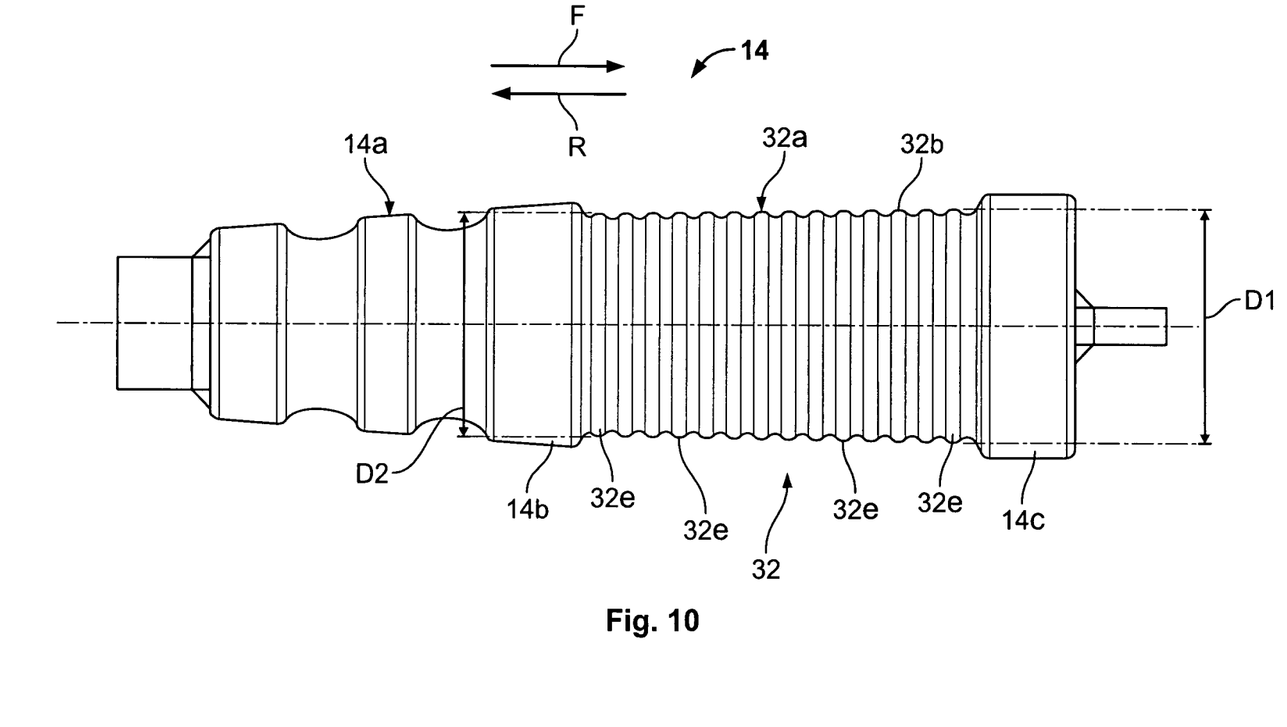
FIG. 10 is a schematic side view of a second embodiment of a strain relief.

FIG. 10 shows a second embodiment of a strain relief element according to the present invention, and the same reference numerals have been used. Since most of the details illustrated therein are identical to the first embodiment, only the differences thereto will be described in more detail.

The fastening portion 32 comprises ring-like protrusions 32e. A plurality of ring-like protrusions 32e forms the corrugation 32b and the corrugated surface 32c.

The outer diameter of the fastening portion 32 tapers in rearward direction R. The outer diameter tapers from the end of the fastening portion 32 pointing in the forward direction F to the end of the fastening portion 32 pointing in rearward direction R. Thus, the outer diameter D1 of the ring-like protrusion 32e at the end pointing in forward direction F is larger than the outer diameter D2 of the ring-like protrusion 32e at the end pointing in rearward direction R. The outer diameter of the ring-like protrusions located between both ends of the fastening portion decrease in rearward direction R.

At both ends of the fastening portion pointing in forward direction F or in rearward direction R, enlarged sections 14b and 14c are provided. The outer diameters of the enlarged sections 14b and 14c are larger than the maximum diameter D1 of the ring-like protrusions 32e or the corrugated surface 32c. The enlarged sections 14b and 14c may serve as stops to secure an enclosure arranged on the fastening portion 32 against sliding off the fastening portion.

What is claimed is:

1. Enclosure assembly for at least one connector, comprising:
an enclosure, the enclosure having a connector volume configured to receive the connector and an opening at least at a rearward end, and
a strain relief element to receive a cable, the strain relief element being provided with a relief portion at one end, the relief portion being configured to support the cable elastically, and with a fastening portion having a peripheral surface, the fastening portion and the enclosure having cooperable engaging surfaces, the fastening portion in a mounted state being arranged at least partially within the opening and affixing the strain relief element to the enclosure, wherein, in a pre-mounted state, the enclosure and the strain relief element are adapted to be slid relative to each other in a forward direction (F) up to a forward position, and in that in the forward position the enclosure is automatically engaged in a friction lock with the fastening portion via the cooperable engaging surfaces, at a position where the fastening portion is at least partially within the opening, wherein the peripheral surface forms one of the engaging surfaces configured to generate a friction lock to the enclosure.

2. Enclosure assembly according to claim 1, wherein the fastening portion comprises a corrugated surface with corrugations that extend substantially transversally to the forward direction (F).

3. Enclosure assembly according to claim 1, wherein the fastening portion has a substantially conical shape, said conical shape tapering in a rearward direction.

4. Enclosure assembly according to claim 1, wherein in the forward position the enclosure is engaged sealingly with the fastening portion.

5. Enclosure assembly according to claim 1, wherein the enclosure comprises a sealing member adapted to sealingly engage the fastening portion.

6. Enclosure assembly according to claim 1, wherein the strain relief element comprises an absorber portion, said absorber portion being arranged at an end of the strain relief element opposite to the relief portion.

7. Enclosure assembly according to claim 6, wherein the absorber portion extends into the enclosure.

8. Enclosure assembly according to claim 6, wherein the perimeter of the absorber portion is smaller than the perimeter of the fastening portion.

9. Enclosure assembly according to claim 1, wherein the strain relief element is configured to be moulded over the cable.

10. Enclosure assembly according to claim 1, wherein the enclosure assembly comprises a stop element configured to be applied to the cable and/or the strain relief element to avoid sliding of the outer body and/or the inner body against rearward direction (R) beyond a rearward position.

11. Enclosure assembly according to claim 1, wherein the enclosure comprises a sleeve-like inner body and a sleeve-like outer body, the inner body comprising the connector volume and a sealing member being arranged at the opening of the connector volume, the outer body being adapted to be slid over the inner body from a rearward position to a forward position and to compress the sealing member in the forward position.

12. Strain relief element for an enclosure assembly for a connector, comprising a relief portion at one end, the relief portion being configured to support a cable elastically, and with a fastening portion having a peripheral surface, the fastening portion arranged at least partially within an opening of an enclosure of the enclosure assembly and to affix the strain relief element to the enclosure, wherein the strain relief element is, at a pre-mounted state, slid along the enclosure up to a forward position at which the enclosure is automatically engaged with the fastening portion, whereby the fastening portion has cooperable engaging surfaces with the enclosure, the fastening portion in a mounted state being arranged at least partially within the opening and affixing the strain relief element to the enclosure, wherein the strain relief element is adapted to be slid relative to the enclosure in a forward direction (F) up to a position where the strain relief element is automatically engaged in a friction lock with the enclosure, at a position where the fastening portion is at least partially within the opening, wherein the peripheral surface forms one of the engaging surfaces configured to generate a friction lock to the enclosure.

13. Enclosure assembly for at least one connector, comprising:
an enclosure having a connector volume configured to receive the connector and an opening at least at a rearward end, the enclosure comprising a sleeve-like inner body, a sleeve-like outer body, and a clamping section, the inner body comprising the connector volume, the outer body being slid over the inner body from a rearward position to a forward position;
a strain relief element to receive a cable, the strain relief element being provided with a relief portion and a fastening portion, the relief portion being configured to support the cable elastically and the fastening portion having a peripheral surface; and
the fastening portion and the clamping section having cooperable engaging surfaces, such that in a pre-mounted state, the enclosure and the strain relief element are adapted to be slid relative to each other in a forward direction (F) up to a forward position, and in the forward position the enclosure is automatically engaged in a friction lock with the fastening portion, wherein the peripheral surface forms one of the engaging surfaces configured to generate a friction lock to the enclosure.

14. Enclosure assembly according to claim 13, wherein the peripheral surface comprising a gripping surface having gripping members for engaging the fastening portion.

15. Enclosure assembly according to claim 14, wherein the gripping surface is defined by corrugations that extend substantially transversally to the forward direction (F).

16. Enclosure assembly according to claim 13, wherein the clamping section is integral with the inner body.

17. Enclosure assembly according to claim 13, wherein in the forward position the enclosure is engaged sealingly with the strain relief element.

18. Enclosure assembly according to claim 13, wherein the enclosure assembly comprises a stop element configured to be applied to the cable and/or the strain relief element to avoid sliding of the outer body and/or the inner body against rearward direction (R) beyond a rearward position.

* * * * *